US008347292B2

(12) United States Patent
Beckerle et al.

(10) Patent No.: US 8,347,292 B2
(45) Date of Patent: Jan. 1, 2013

(54) TRANSACTION AGGREGATION TO INCREASE TRANSACTION PROCESSING THROUGHOUT

(75) Inventors: Michael James Beckerle, Needham, MA (US); Michael John Carney, Pepperell, MA (US)

(73) Assignee: International Business Machines Corporation, Armonk, NY (US)

( * ) Notice: Subject to any disclaimer, the term of this patent is extended or adjusted under 35 U.S.C. 154(b) by 1480 days.

(21) Appl. No.: 11/848,115

(22) Filed: Aug. 30, 2007

(65) Prior Publication Data

US 2009/0064147 A1    Mar. 5, 2009

(51) Int. Cl.
*G06F 9/46* (2006.01)
*G06F 7/00* (2006.01)
*G06F 12/00* (2006.01)

(52) U.S. Cl. .................... 718/101; 707/693; 707/826
(58) Field of Classification Search .................. 718/101
See application file for complete search history.

(56) References Cited

U.S. PATENT DOCUMENTS

| | | | |
|---|---|---|---|
| 5,115,392 A | | 5/1992 | Takamoto et al. |
| 5,423,040 A | * | 6/1995 | Epstein et al. ................. 718/102 |
| 6,122,372 A | * | 9/2000 | Hughes ............................. 380/2 |
| 6,272,602 B1 | * | 8/2001 | Singhal et al. ................. 711/144 |
| 6,311,265 B1 | | 10/2001 | Beckerle et al. |
| 6,801,938 B1 | | 10/2004 | Bookman et al. |
| 6,978,305 B1 | * | 12/2005 | Nainani et al. ................. 709/225 |
| 7,020,633 B2 | * | 3/2006 | Strayer et al. ..................... 705/39 |
| 7,120,825 B2 | * | 10/2006 | Ji et al. ............................. 714/6 |
| 7,720,678 B2 | * | 5/2010 | Falcon et al. ................. 704/231 |
| 7,792,716 B2 | * | 9/2010 | Gooding et al. ............... 705/35 |
| 2005/0086360 A1 | | 4/2005 | Mamou et al. |
| 2005/0102554 A1 | * | 5/2005 | Zohar et al. ....................... 714/6 |
| 2006/0074977 A1 | * | 4/2006 | Kothuri et al. ............. 707/104.1 |
| 2006/0230402 A1 | | 10/2006 | Newport et al. |

OTHER PUBLICATIONS

Deshong, A., M. Carney, and M. Polston, "Scalable on Demand Data Integration WebSphere DataStage EE MQ/UOW JP Morgan Chase Views Portfolio Reporting", IBM Information Integration Solutions Live 2005, 35 pp.
Morrison, J.P., "Flow-Based Programming: A New Approach to Application Development", 1994, Van Nostrand Reinhold, New York, Ch. 10, 13 pp.
D'Abreo, L., "High-Volume Transaction Processing in J2EE", [online], 2007, [Retrieved on Dec. 17, 2008]. Retrieved from the Internet at <URL: http://www.devx.com/Java/Article/20791/1954?pf=true>, 5 pp.
D'Abreo, L., "High-Volume Transaction Processing in J2EE", [online], 2007, [Retrieved on Dec. 17, 2008]. Retrieved from the Internet at <URL: http://www.devx.com/Java/Article/20791/0/page/1>, 5 pp. PCT International Search Report and Written Opinion, Jan. 22, 2009, for International Application No. PCT/EP2008/061003, 12 pp.

* cited by examiner

*Primary Examiner* — Jennifer To
*Assistant Examiner* — Wissam Rashid
(74) *Attorney, Agent, or Firm* — Janaki K. Davda; Konrad, Raynes, Davda & Victor LLP

(57) ABSTRACT

Provided are techniques for increasing transaction processing throughput. A transaction item with a message identifier and a session identifier is obtained. The transaction item is added to an earliest aggregated transaction in a list of aggregated transactions in which no other transaction item as the same session identifier. A first aggregated transaction in the list of aggregated transactions that has met execution criteria is executed. In response to determining that the aggregated transaction is not committing, the aggregated transaction is broken up into multiple smaller aggregated transactions and a target size of each aggregated transaction is adjusted based on measurements of system throughput.

24 Claims, 12 Drawing Sheets

TRANSACTION AGGREGATION TO INCREASE TRANSACTION PROCESSING THROUGHOUT

BACKGROUND

1. Field

Embodiments of the invention relate to automated transaction aggregation to increase transaction processing throughput.

2. Description of the Related Art

Dataflow programming, also called Flow-based Programming (FBP), is a technique that has been used to make the expression of high-volume batch data processing both easy and effective: easy because the logic is naturally captured. Effective because both parallel and pipelined parallel processing can be used to increase throughput. However, these same flow-based programming techniques are less well recognized as means for expression of online and transaction processing applications.

Flow-Based Transaction Processing (FBTP) describes flow-based application development techniques that are used to create high-performance transaction processing systems. Customers desire to stretch the functionality of FBP systems (e.g., a DataStage product from International Business Machines Corporation) to encompass transaction processing. Customers derive value from both the high performance of the resulting systems, and the ability to share business logic between transactional processing and high-volume batch data processing using common graphical development tooling. There are existing systems which perform composition of transactions. Microsoft Transaction Server (MTS) and J2EE™ application servers both feature declarative transaction composition. (J2EE is a trademark of Sun Microsystems, Inc. in the United States, other countries, or both). However, since these systems are not expressed as dataflow networks they do not benefit from the attendant data separation properties; hence, the scale of transaction aggregation they can achieve is lower, thereby limiting their ability to increase throughput.

SUMMARY OF EMBODIMENTS OF THE INVENTION

Provided are a method, computer program product, and system for increasing transaction processing throughput. A transaction item with a message identifier and a session identifier is obtained. The transaction item is added to an earliest aggregated transaction in a list of aggregated transactions in which no other transaction item as the same session identifier. A first aggregated transaction in the list of aggregated transactions that has met execution criteria is executed. In response to determining that the aggregated transaction is not committing, the aggregated transaction is broken up into multiple smaller aggregated transactions and a target size of each aggregated transaction is adjusted based on measurements of system throughput.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments enable creating and deploying transaction processing systems in which the individual transactions can be aggregated into larger transactions in such a way that the system behavior is still correct, but the average transaction size can be much larger. This can improve overall system throughput by amortizing the cost of transaction coordination over a much larger number of changes to the associated transactional resources (e.g., databases, queuing systems, transactional file systems, etc.) These costs can be particularly high in distributed transaction coordination environments.

Embodiments provide adaptive logic that aggregates transactions to reduce overhead in an automatic way, increasing the size while the throughput is increasing, and decreasing the size automatically if throughput is negatively impacted.

Embodiments express the transaction processing system as a dataflow network, or using an equivalent dataflow-based programming language. Embodiments also depend on the identification of data separation properties that allow determination of when transaction aggregation is possible. In certain embodiments, the data-separation properties may be the same ones used to express the potential for parallelism in the batch-style dataflow systems. Moreover, the set-oriented nature of dataflow networks enables the automated aggregation to work.

Figure 1:
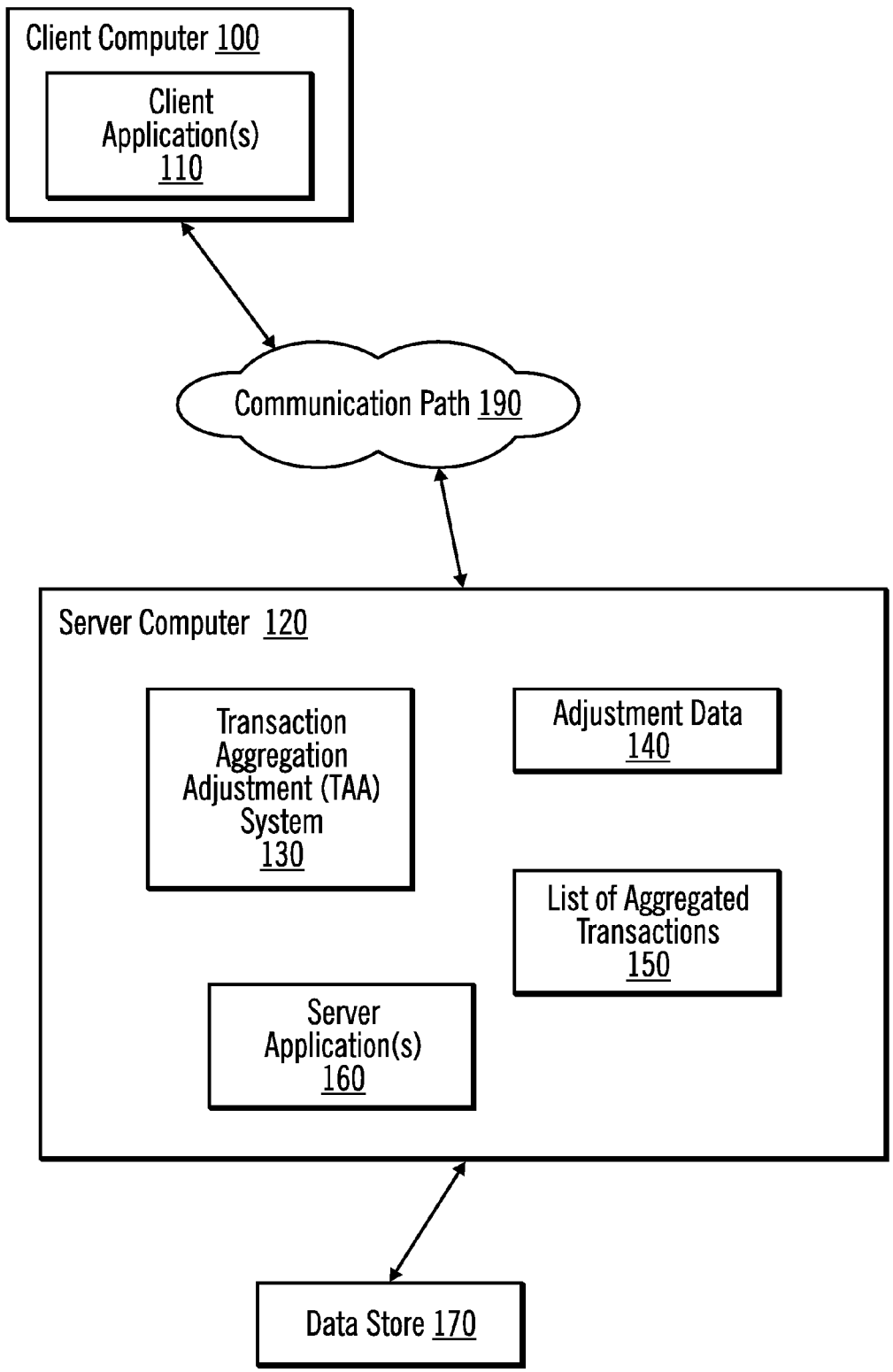
FIG. 1 illustrates details of a computing device in accordance with certain embodiments.

FIG. 1 illustrates details of a computing device in accordance with certain embodiments. A client computer 100 is connected via a communication path 190 to a server computer 120. The client computer 100 includes one or more client applications 110.

The server computer 120 includes a transaction aggregation adjustment (TAA) system 130, adjustment data 140 (e.g., measurements of system throughput), a list of aggregated transactions 150, and one or more server applications 160. The server computer 120 provides the client computer 100 with access to data in a data store 170.

The client computer 100 and server computer 120 may comprise any computing device known in the art, such as a server, mainframe, workstation, personal computer, hand held computer, laptop telephony device, network appliance, computer cluster, etc.

The communication path 190 may comprise any type of network, such as, a peer-to-peer network, spoke and hub network, Storage Area Network (SAN), a Local Area Network (LAN), Wide Area Network (WAN), the Internet, an Intranet, etc.

The data store 170 may comprise an array of storage devices, such as Direct Access Storage Devices (DASDs), Just a Bunch of Disks (JBOD), Redundant Array of Independent Disks (RAID), virtualization device, etc.

A process may be described as a dataflow diagram. A process may be constructed from the following components: a dataflow diagram, operators, and arcs. A dataflow diagram may be described as a directed graph where the vertices/boxes of the graph are called operators and the arcs describe directional flow of data. The dataflow diagram describes the data as the data flows from various data sources through the different operators to various data targets. A dataflow diagram may be drawn or may be created from a dataflow programming language. Operators are able to read data from an external resource, write data to an external resource, and/or apply data transformations while doing so. In general, operators are able to consume data from every incoming arc and can produce data on every outgoing arc. In a typical dataflow process-authoring tool, many operators are provided as built-in operators to provide common data access and transformations, while others can be created by the user and easily integrated into the system. Arcs represent flow of data between two connected operators. Arcs behave as First In First Out (FIFO) queues. That is, data items on an arc cannot pass each other. They leave the arc in the order they entered.

A continuous process may be described as a process that reads from continuous data sources (i.e., data sources that provide data continually) and generates result data corresponding to input data as the input data becomes available.

A transactional process is a continuous process that reads from transactional resources as its data sources, and writes to transactional data resources as its targets. A typical case of this is reading from a message queue and writing to one or more database tables in one or more database systems, as well as writing to output message queues and to transactional file systems.

For ease of explanation, it is assumed that the transactional process has a single input operator. Note that multiple operators as input may be pre-merged into a single feed.

Figure 2:
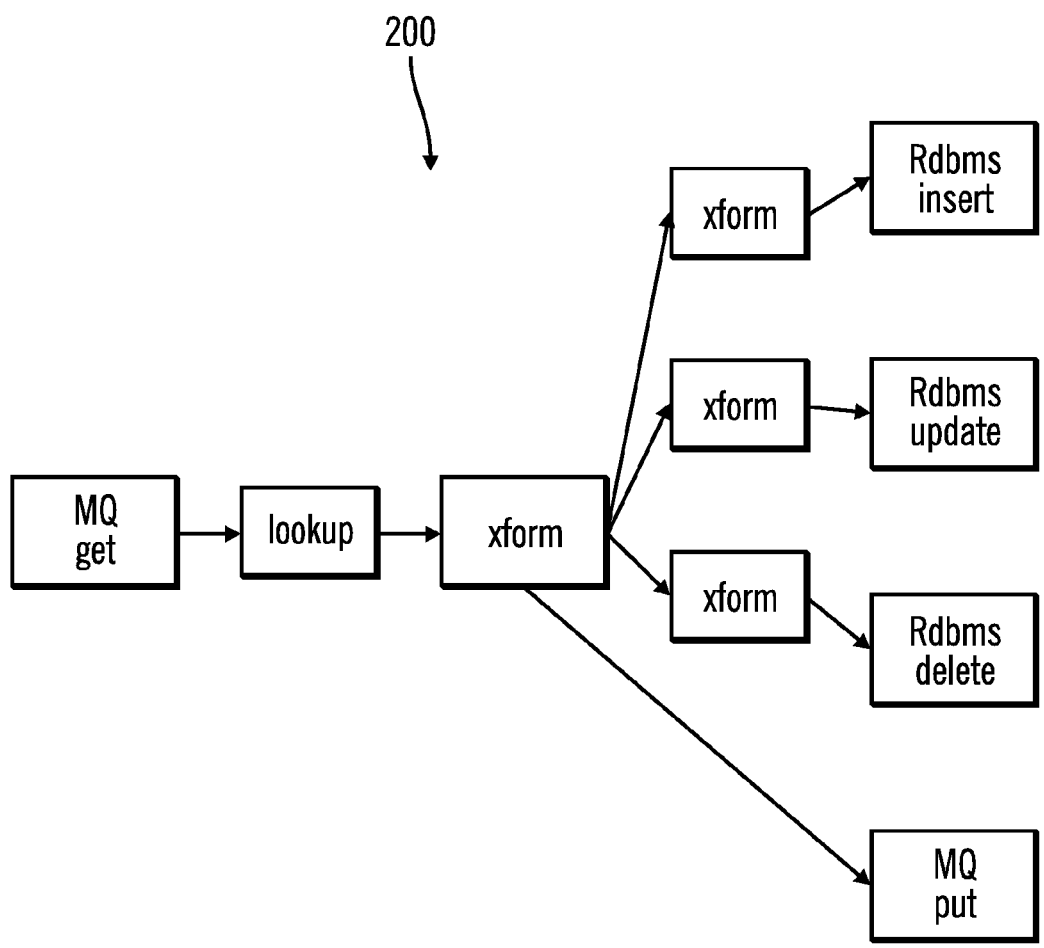
FIG. 2 illustrates a dataflow diagram with a transactional process in accordance with certain embodiments.

FIG. 2 illustrates a dataflow diagram 200 of a transactional process in accordance with certain embodiments. In FIG. 2, a message queue get method (MQ get) retrieves a message from a message queue. The lookup performs a lookup in a table. The transform (xform) transforms data. The Relational DataBase Management System (RDBMS) insert, update, and delete perform these actions on tables. The message queue put method (MQ put) puts a message into the message queue.

Each data item read from the input is called a transaction item. Each transaction item has a session identifier (SID) as well as whatever other data is to be used to describe the content of the transaction. When two transaction items carry the same SID, it means that they are to be processed in separate transactions, and those transactions are to execute in the order of arrival of the transaction items. Each transaction item also carries a message identifier (MID) that is unique to all transactions having the same SID. Two transaction items with different SID values can be processed together as part of the same transaction or part of separate transactions, and the order of their processing does not matter.

In certain embodiments, the SID is a token associated with an input message in such a way that any two messages with a different SID can be processed in parallel. In practice, this is achieved by identifying sets of messages which cannot be processed in parallel and associating the same SID with all the messages in the same set. In certain embodiments, the SID is part of the message (e.g., an account number or customer number might identify a session, or a browser cookie value might be the SID for internet applications (e.g., online shopping)).

In certain embodiments, the MID is a token associated with an input message which uniquely identifies that input message even if it is executed in combination with others as part of one transactional implementation. If there isn't a natural MID in the message payload, then the MIDs can be assigned integers from a counter based on order of arrival of a message into the input queue.

In certain embodiments, the message identifier is unique within a SID so that the SID+MID together form a unique ID for the message. Embodiments use this unique ID in order to deal with failures. In processing, one incoming message at the input queue might produce many records in the processing flow during its processing (e.g., show all my account balances). One record per each of ½ dozen accounts or so might be created due to one incoming request message. These ½ dozen records would move throughout the dataflow diagram and could be separated and processed independently by various operators. All those records carry the same MID and SID as the incoming request message. Thus, if anything goes wrong with any of those records the "blame" can be placed on the specific incoming message via the SID+MID that uniquely identify the message.

Embodiments are applicable to systems even in the absence of any ordering requirement of the input messages. Merely to enhance understanding, a simple bank ATM example is provided herein. (Note that this is a highly simplified example for the sake of explanation here. Real ATM networks are far more complex than this.) Suppose there is a network of bank ATM machines. Each person at one ATM machine is creating messages having to do with their personal session at the ATM machine. Those messages must be processed in order, and so must carry the same SID. But the message streams from many ATM machines are interleaved as they enter eventually the input queue for the application. Since each ATM machine can service only one customer at a time, embodiments may use an ID of the ATM machine as the SID.

Figure 3:
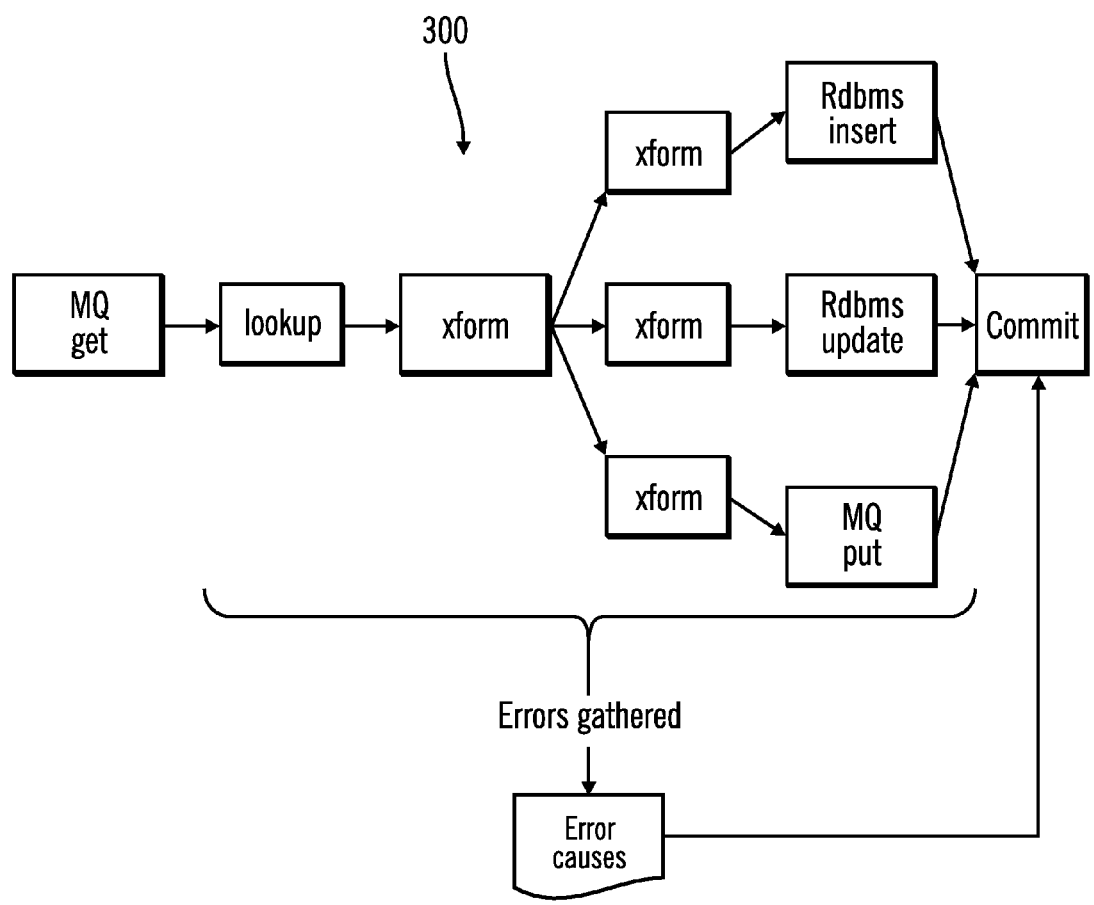
FIG. 3 illustrates a dataflow diagram with commit and error processing in accordance with certain embodiments.

FIG. 3 illustrates a dataflow diagram 300 with commit and error processing in accordance with certain embodiments. During the transaction process, errors are gathered, and an error causes document is generated that is forwarded to the commit block. In the commit block, if there are no unacceptable errors, the transaction process commits (i.e., the commit block may determine that, although there are errors, commit should still occur).

Figure 4:
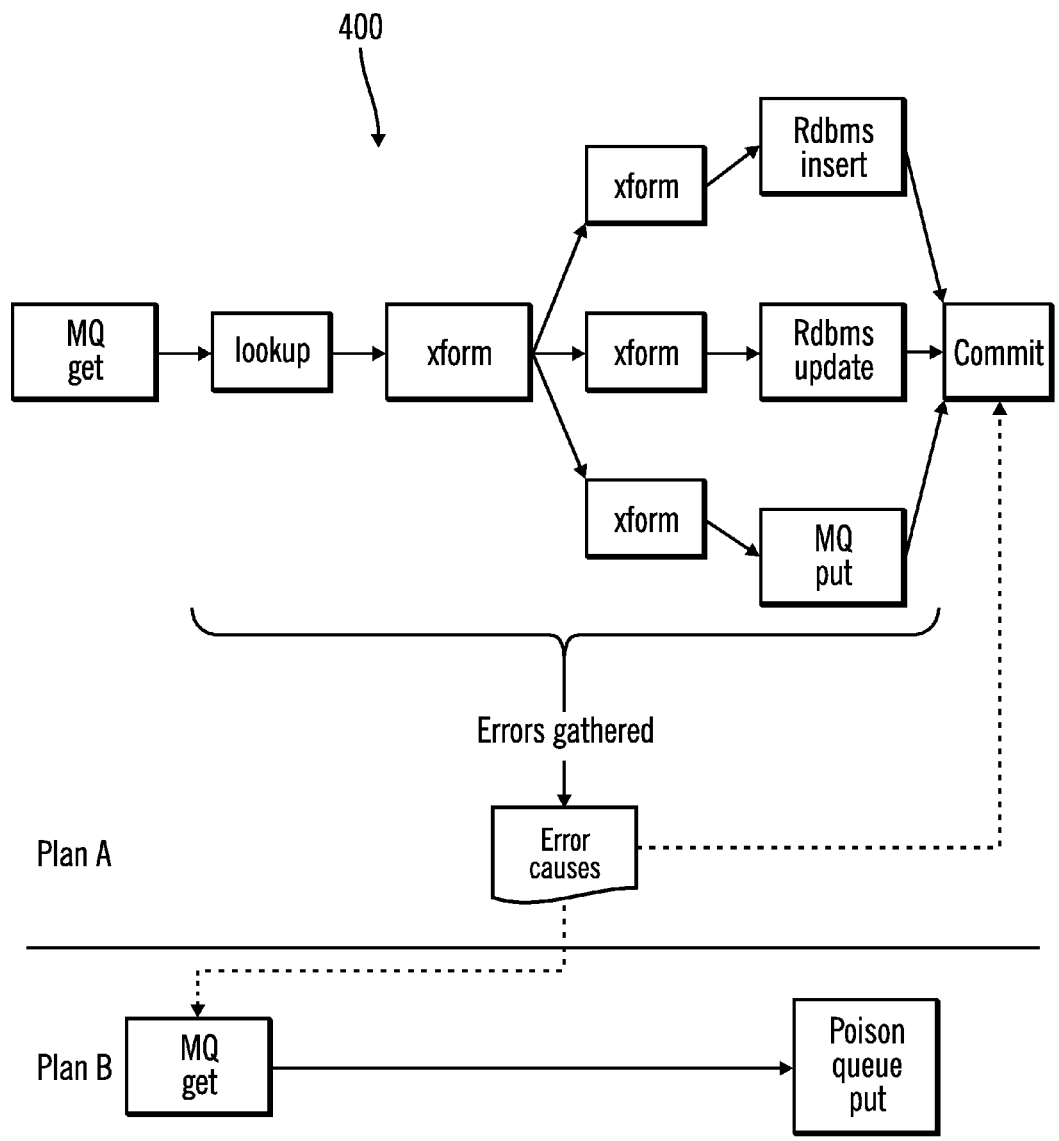
FIG. 4 illustrates a dataflow diagram with a poison queue in accordance with certain embodiments.

FIG. 4 illustrates a dataflow diagram 400 with a poison queue in accordance with certain embodiments. A transactional process also has an associated poison or reject queue. The poison queue may be described as a queue onto which poison transaction items are placed. Poison transaction items are transaction items that cannot be successfully processed. That is to say that all resource actions attempted after the "MQ get" up to and including the "commit" for processing that transaction item fail with errors, or always fail to commit (potentially even after some number of repeated attempts).

In FIG. 4, the transactional flow consists of a primary plan or "Plan A", which is the intended processing flow, and an alternate or "Plan B" which puts transactions that can't be handled into the poison or reject queue.

A transactional process has parallelism available proportional to the number of concurrent distinct session identifiers (SIDs) available for processing in the input at any given moment of time. Each Session's transaction items are processed sequentially, but across sessions there is parallelism. This is the concurrency frequently exposed by application servers and other transaction processing environments.

In certain embodiments, performance may be gained by trading off available parallelism against transaction granularity. If there is enough excess parallelism available then transactions from different sessions can be aggregated to reduce overhead while still having enough parallelism for high-performance execution.

Figure 5:
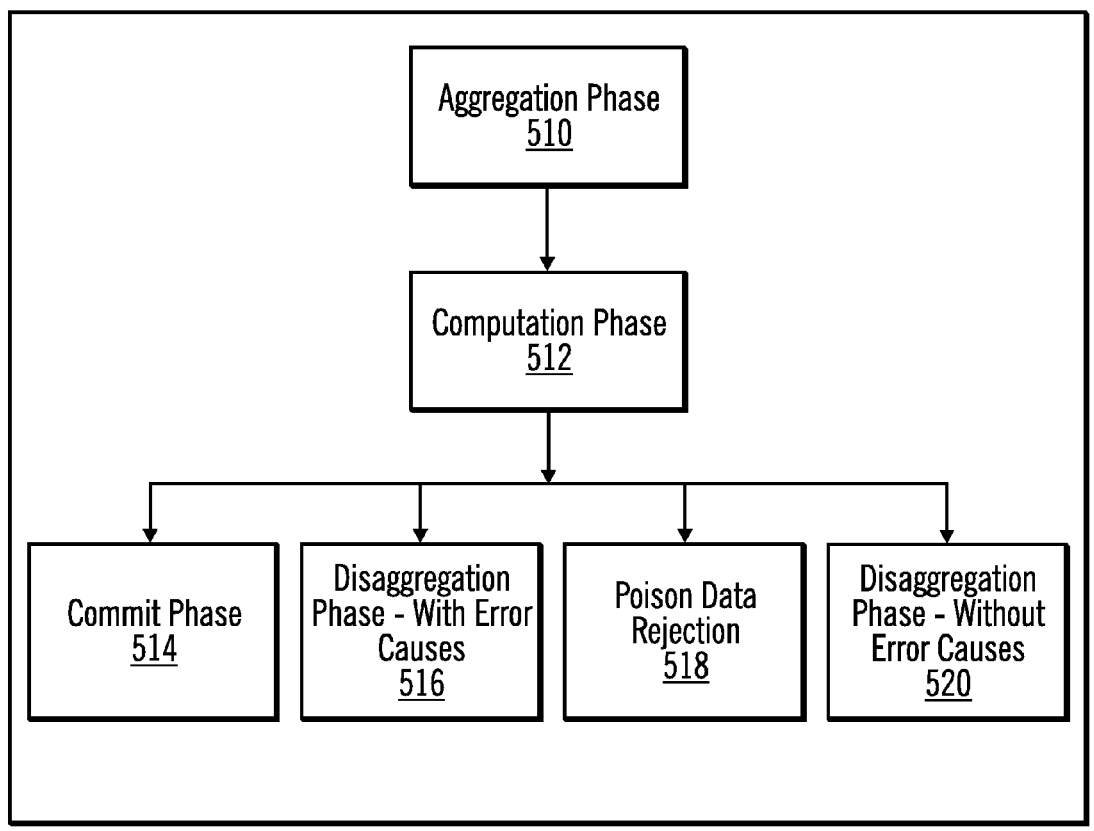
FIG. 5 illustrates a list of phases of transaction processing in accordance with certain embodiments.

FIG. 5 illustrates a list of phases of transaction processing in accordance with certain embodiments. Transaction processing includes an aggregation phase 510, a computation phase 512, a commit phase 514, a disaggregation phase with error causes 516, and a disaggregation phase without error causes 518.

In the aggregation phase 510, when a transaction item is read from a transactional resource, such as a queue, the logic for determining whether the transaction can be aggregated into a larger transaction with other transaction items is begun.

A list of aggregated transactions is maintained. The order in the list is the order that the transaction aggregates are to be processed. The incoming transaction item is added to the first aggregated transaction that does not yet contain a transaction having the same SID.

Figure 6:
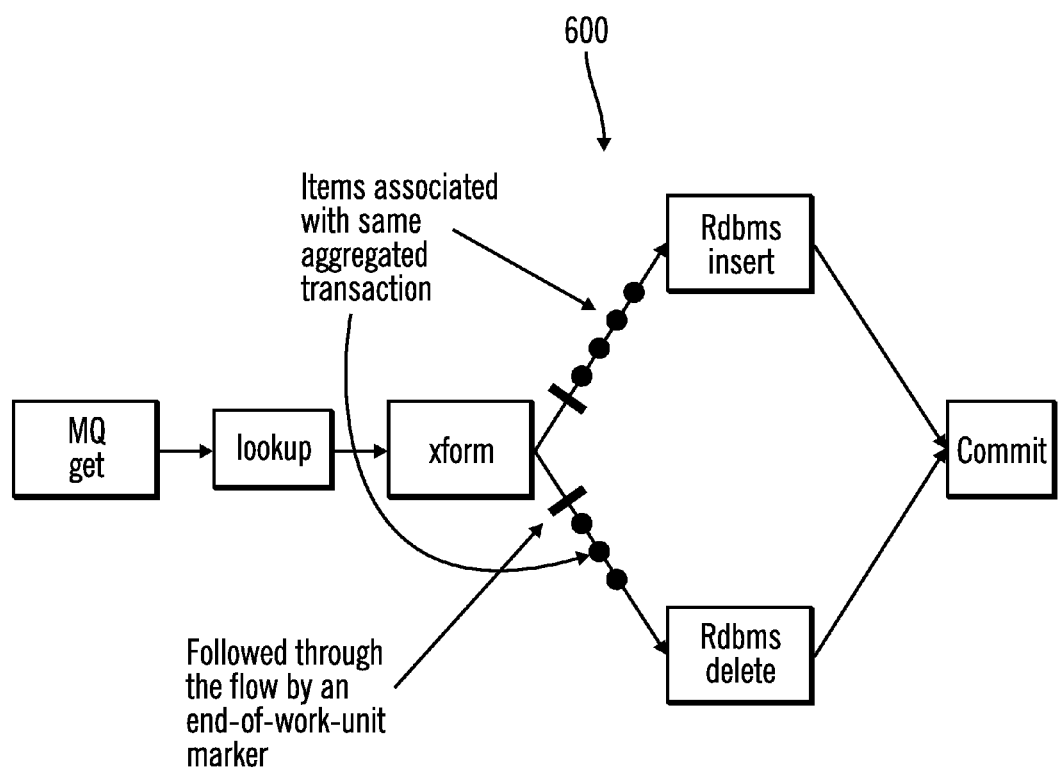
FIG. 6 illustrates a dataflow diagram with processing of an aggregated transaction in accordance with certain embodiments.

FIG. 6 illustrates a dataflow diagram 600 with processing of an aggregated transaction in accordance with certain embodiments. When execution criteria (e.g., expiration of a timer or size of the aggregated transaction reaches a target size) are met, the first aggregated transaction on the list is removed and sent down the dataflow for processing in the computation phase 514. The aggregated transaction's data (i.e., the transaction items that make up the aggregated transaction) is sent into the dataflow diagram one transaction item at a time. The last transaction item of the aggregate is followed by an end-of-work-unit (also known as a "wave") marker. The wave marker may be described as a signal to phases that this is a transaction boundary, for example, it is a signal to the RDBMS Insert and RDBMS Delete in FIG. 6 to proceed to commit. Thus, the wave marker may be described as signaling an end of the computation phase for the aggregated transaction which it follows in the computation.

This build up of aggregated transactions in the aggregation phase 510 can continue in parallel with the computation phase 512 of a previous aggregated transaction.

The execution criteria mentioned above can include: expiration of a timer (to bound transaction execution latency) and size of the aggregated transaction reaches a target size.

The target size of the aggregated transaction is selected adaptively. The throughput of the system is measured for each aggregated transaction being processed. The target size is increased so long as transaction throughput increases. When transaction throughput decreases then the target size is lowered. There are a variety of techniques for avoiding wild oscillations in the target size involving adjusting it based on moving averages, adding a random noise factor, and so forth. Embodiments subsume all such adjustment techniques.

In certain embodiments, there is an optimization in which the first list item in the list of aggregated transactions is not held back. The first list items need not be added to the list of aggregated transactions (e.g., because the wave marker ensures that all list items are processed and committed), but can be sent directly into the flow. When the wave marker has flowed over the arcs of the process and the terminal operators have finished computing for that work unit, then the computation is said to have finished for that aggregated transaction.

In certain embodiments, more than one record with the same SID is not put into an aggregation because it is assumed that the dataflow processing downstream does not take place in a single process and might use pipelined processing; hence, there is no guarantee of sequential consistency for side-effects. If the dataflow processing downstream does provide for sequential consistency (e.g., no pipeline and only one database connection because it is all one process), then embodiments change the aggregation logic accordingly. In particular, embodiments change aggregation logic to allow more than one record with the same SID to be put into an aggregation, because data integrity is inherently maintained by sequential processing.

Figure 7:
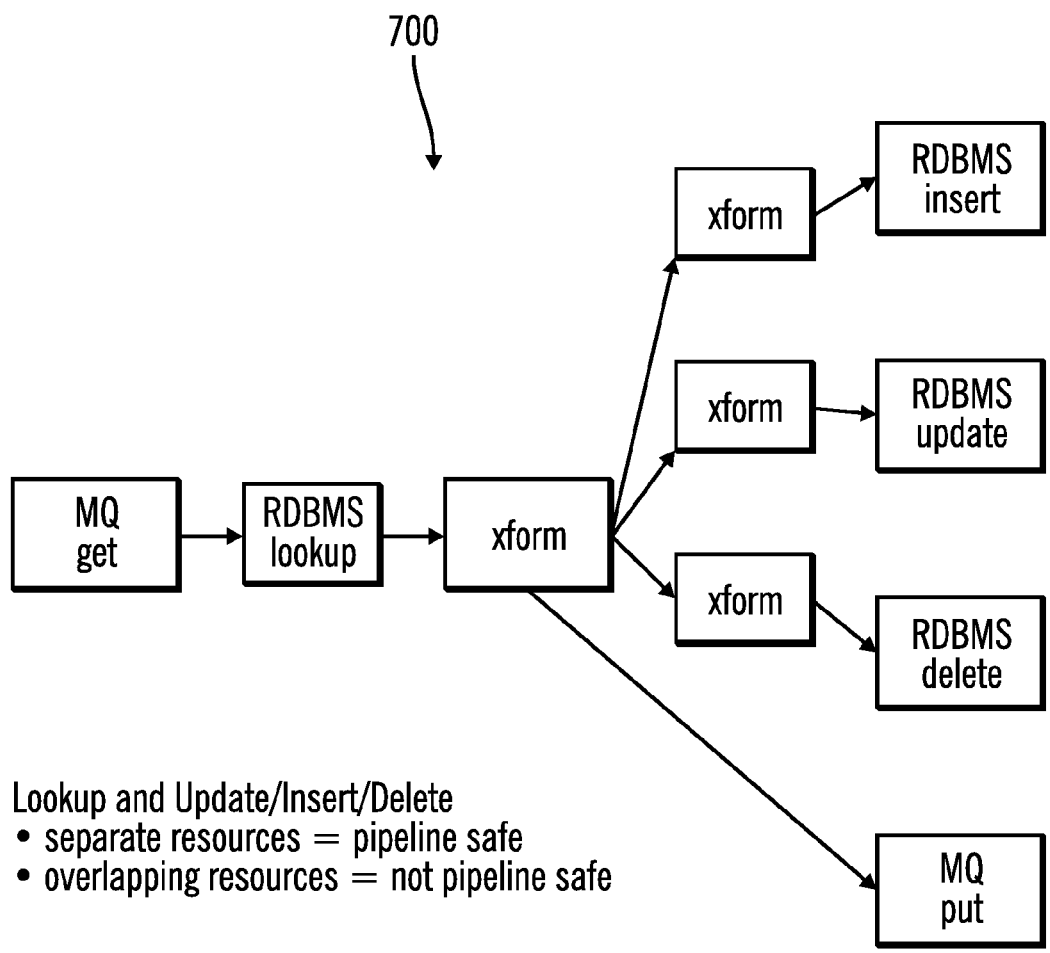
FIG. 7 illustrates a dataflow diagram with pipeline safe concepts in accordance with certain embodiments.

FIG. 7 illustrates a dataflow diagram 700 with pipeline safe concepts in accordance with certain embodiments. In certain embodiments, if the dataflow does not reference (i.e., lookup) against any resource that it also updates, then the dataflow is said to be pipeline safe. In this situation, embodiments can aggregate multiple transaction items having the same SID into an aggregated transaction without affecting the semantics of the application so long as these multiple items having the same SID are processed in arrival order. Furthermore, embodiments can pipeline the individual transaction items making up an aggregated transaction into the dataflow execution process, allowing extensive use of pipeline parallelism to improve performance. Furthermore, embodiments need not build up a first aggregated transaction set. Rather, this first set can exist virtually. Each item identified for the first aggregated transaction set can be sent directly into the flow graph. At the point where the above-described "execution criteria" are met, embodiments can put the end-of-work-unit marker into the flow graph and begin pipelining the items from the next aggregated transaction set immediately behind it. Embodiments insure that no subsequent aggregated transaction commits until a preceding one has fully committed (i.e., including all transactions, including those created by disaggregation described later.)

In certain embodiments, if the dataflow is not pipeline safe, then embodiments: (a) process the transaction items of an aggregated transaction one by one through the entire dataflow, but reserve any commit for after the computation phase 512, or (b) separate the aggregated transactions so that no two transaction items with the same SID go into the same aggregated transaction set. Since the aggregated transaction sets are processed one by one (including their final commit), this insures preservation of the semantics of the process.

In certain embodiments, pipeline safe means, for example, that a dataflow can lookup account number X in table Y, then update table Z with the results. The tables are disjoint so there is no dependency relationship between the lookup and the update; hence, embodiments can pipeline requests into the flow without any change in semantics. There could be any sort of buffers in between the operators of the flow and the semantics are not affected. In certain embodiments, all lookups are performed, then all the updates are performed. In certain embodiments, the lookups and updates are interleaved.

Pipeline safe also means the dataflow can lookup account number X in table Y, then update table Y at the specific row for account number X, so long as it is known that nothing else carrying account number X is in the pipeline. In this case the tables are not disjoint, but the rows are known to be.

Pipeline unsafe means the dataflow can lookup account number X in table Y, then update table Y with some results, but embodiments cannot know if the update is to a record which will be looked up in a subsequent lookup by a subsequent record. The lookup is or might be to the same record. In this case it is not safe to pipeline input messages into the dataflow since it is not known how the updates and lookups will be interleaved and different interleavings may produce different semantics. For example, imagine all the input messages carry the same account number X. If all the lookups are performed in table Y first, then all the updates are performed, the results can clearly be different than if the lookups and updates are interleaved.

Thus, given knowledge about the dataflow that is obtained via analysis of the dataflow diagram and properties of its operators, embodiments can be aggressive with parallelism/overlap in the implementation.

In the computation phase 512, when processing an aggregated transaction through the dataflow, the individual transactions flow through the graph of operators, the paths through the graph are finally traversed by the end-of-work-unit marker, which marker splits and joins to follow paths through the graph so as to insure that the graph is empty and the end of processing can be detected. This wave feature is described in U.S. Patent Application No. 20050086360, published on Apr. 21, 2005, which is incorporated by reference herein in its entirety.

Every data item flowing on the dataflow diagram carries the session identifier (SID) and message identifier of the original transaction that caused its creation; hence, if a single incoming transaction item causes the dataflow diagram to create many data items destined for some transformation logic or for a target resource, each of these data items carries the SID and MID from that record.

The pending aggregated transaction includes the updates, inserts, deletes, enqueues and dequeues, and so forth expressed by the process during the processing of the aggregated transaction. Once the dataflow diagram has finished processing the aggregated transaction, embodiments attempt to commit the pending aggregated transaction.

If an error is detected during the computation phase, for example, a SQL database operation fails, or a transformation calculation divides by zero, then the MID is extracted from the data item that caused the error. If multiple errors are detected, then there can be a collection of MIDs which represent the set of transaction items that caused the errors. These MIDs are called the error causes, and they are used in the disaggregation phase 516 described below. The computation phase can be ended immediately once at least one error MID shows up in the error causes. Alternatively a full set of error cause MIDs can be collected or the computation phase 512 ended immediately once some number of MIDs are found in the error causes. A variety of decisions can be used here. For example, errors can cause all or part of the transaction (the bad MIDS) to be directed to the disaggregation phase 516.

Once the computation phase ends, if there are no error causes, embodiments carry out the commit phase 514. If there are error causes, embodiments go immediately to the disaggregation phase 516.

If there is a commit, the pending aggregated transaction is committed. If the commit succeeds then this completes the processing of all transactions in the aggregated transaction, and embodiments go back to the aggregation phase 510 to identify and begin processing of another aggregated transaction.

If the commit fails, then all side-effects of actions on the resources are rolled back automatically (as usual for transactional resources).

In certain embodiments, it is possible to defer beginning the transaction to the latest possible moment by browsing the input queue during the aggregation phase 510 and executing the destructive dequeue operations when the rest of the update operations are successful. That is, embodiments execute the destructive dequeue operations just before the commit operation. This keeps transaction "open time" as small as possible given a particular aggregation granularity. A destructive dequeue operation (also known as a destructive read) is an operation in which a message is read and deleted from a queue, unlike browsing in which a message is read, but not deleted.

In the disaggregation phase—with error causes 516, if there are error causes that have been identified, then embodiments break up the aggregated transaction into multiple smaller aggregated transactions such that each new aggregated transaction contains only transaction items having at most one of the MIDs in the error causes. In certain embodiments, the offending error-causing transaction items are isolated in their own "aggregated" transactions, each of which contains exactly one transaction item. Embodiments then process each of these new aggregated transactions in the same way as above described as if these new aggregated transactions were the ones flowing out of the aggregation operator originally.

After some amount of disaggregation, an individual transaction item that is an error cause makes up an "aggregated" transaction by itself. In this case, embodiments have done as much disaggregation as possible, and the transaction item still causes failures. In certain embodiments, the transaction item is retried in the flow some number of times, and once the transaction item is seen to end in an error cause a certain number of times, the transaction item is rejected as poison data. The poison data transaction is placed onto the poison data queue, and a transaction which includes the dequeueing of that transaction from the incoming queue along with the enqueuing of it into the poison queue is executed. This transaction should not fail, but, if the transaction does fail, it is determined that the system is down.

In the disaggregation phase with no error causes 518, if there are no error causes, then the system may have failed to commit the pending aggregated transaction due to transient problems or to exhaustion of resources because the aggregated transaction is simply too large. In this case, embodiments disaggregate by splitting the aggregated transaction into a number of smaller aggregated transactions (e.g., the transaction may be split it in half, broken up to individual transaction items, etc.). Embodiments then process each of these new aggregated transactions in the same way as above described as if these new aggregated transaction were the ones flowing out of the aggregation operator originally. If the aggregated transaction that failed to commit consists of one transaction item, then embodiments process the aggregated transaction as poison data.

In certain embodiments, secondary transactions are available when using the poison data queue for the transaction item. This poison queue may feed into an alternate transaction processing dataflow diagram that has different logic. This secondary graph attempts to process the item differently and attempts to commit different actions on resources. Even though the transaction item was poison to the original processing flow, the transaction item may still be processed successfully by the secondary processing flow. The secondary flow can even re-aggregate the transactions and otherwise use the same techniques described here for the basic transactional aggregation system. The secondary flow may depend on the nature of the rejection reason. For example, MIDS rejected for invalid name and address data can be cleansed and reprocessed in one secondary flow, while MIDS rejected for invalid numeric data can be sent back to the source for repair in a second secondary flow. In certain embodiments, there may be an arbitrary-length chain of this kind of flow logic, each consuming the rejects from the prior flow (e.g., an original flow, a secondary flow, a tertiary flow, etc.)

Figure 8:
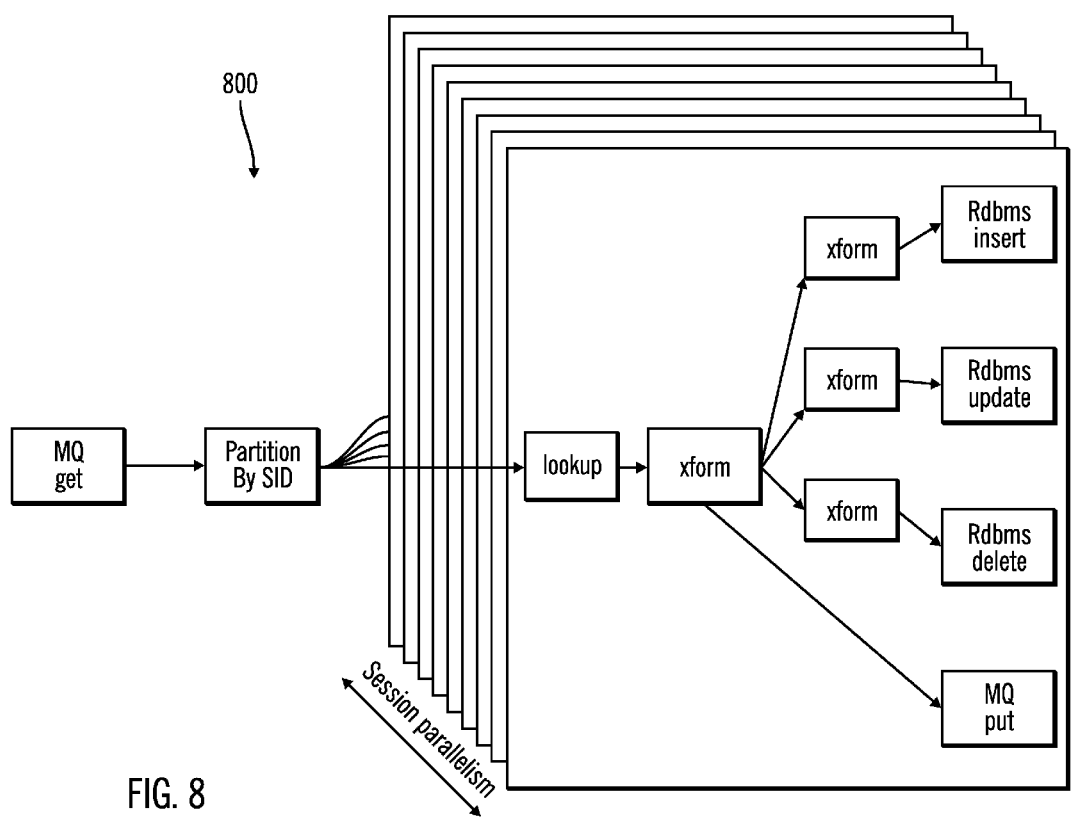
FIG. 8 illustrates a diagram with use of parallelism in accordance with certain embodiments.

FIG. 8 illustrates a diagram 800 with use of parallelism in accordance with certain embodiments. Embodiments can perform the above described technique in parallel by preceding the aggregation phase with a splitting phase. The splitting phase divides up the incoming transaction items into partitions by any logic that insures all transaction items having the same SID end up in the same partition. Each partition is then an input to a separate instance of the above processing from aggregation onward. In certain embodiments, a common poison data queue can be used by all partitions. Such parallelism uses a hash function on the SID for the splitting. A hash partition function guarantees that records with identical keys will flow in the same partition.

The TAA system 130 adjusts the target size of aggregated transactions created by the aggregation phase 510 automatically based on measurements of system throughput. Since the disaggregation and retry looping may reduce system throughput, the TAA system 130 automatically makes the target size smaller so that a target aggregate size is chosen that is as large as it can be but: not so large that it is likely to contain a poison transaction item and not so large that it is likely to fail for transient reasons or resource limitation reasons.

In certain embodiments, aggregation creates deadlocks, and disaggregation is able to clear any deadlocks that would not occur in a non-aggregating implementation. Adaptive adjustment of the size of aggregation based on throughput avoids making this problem really bad such that it slows overall system performance. Deadlocks and timeouts occur most frequently under heavy loads. Heavy loads can be introduced by large transactions or the overhead of many small transactions. Adjusting the size of the transaction may improve overall system performance, thus reducing potential of a deadlock.

Embodiments express the processing logic so that the processing logic can be applied to sets of aggregated transactions where the aggregations respect the need for FIFO processing of transactions with the same SID. In certain embodiments, the processing logic is expressed using dataflow techniques, with the added benefit that parallelism (both partition and pipeline) may be exploited when possible side by side with automated transaction aggregation.

Figure 9A:
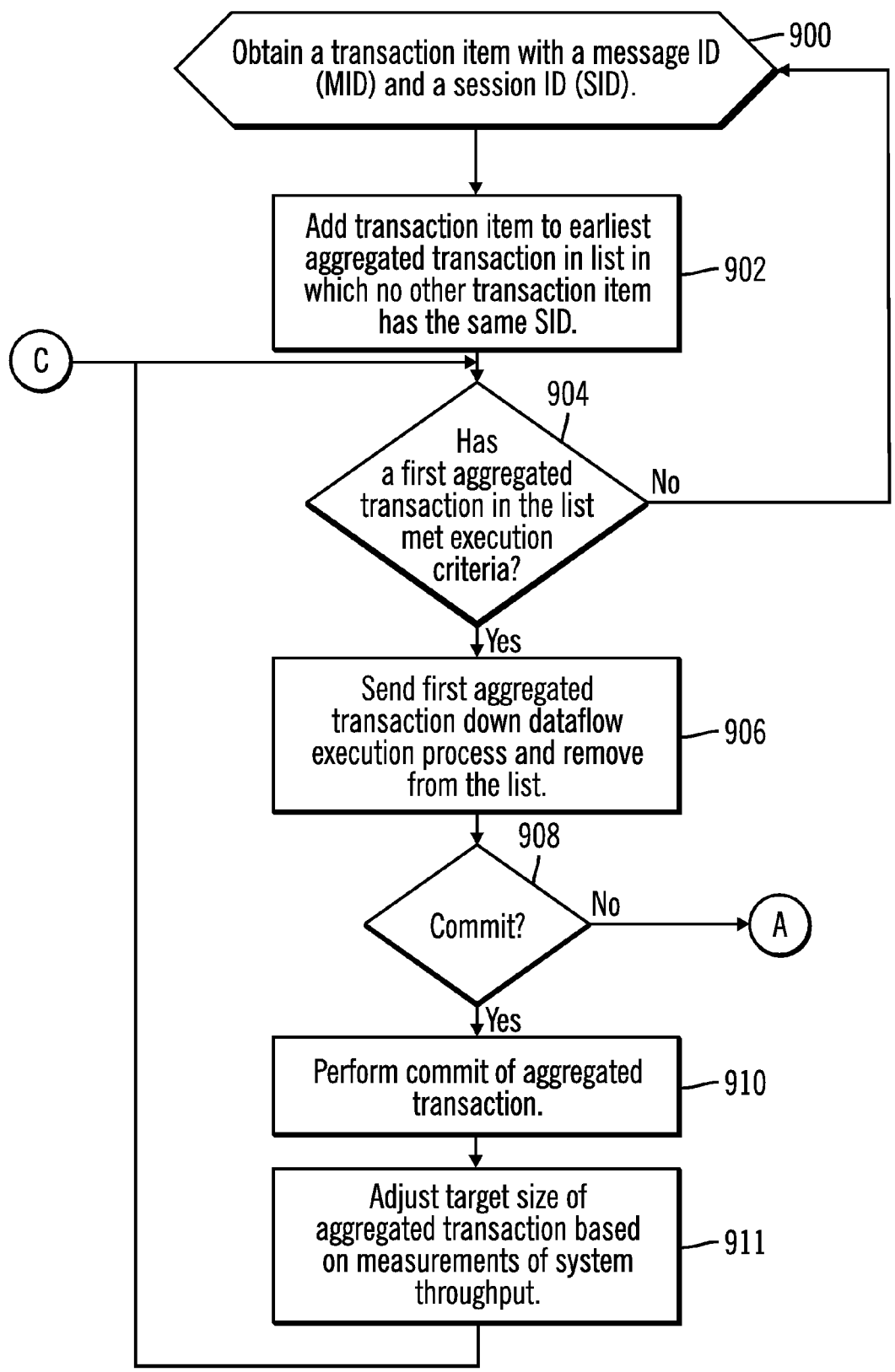
FIGS. 9A, 9B, and 9C illustrate logic in accordance with certain embodiments.
Figure 9B:
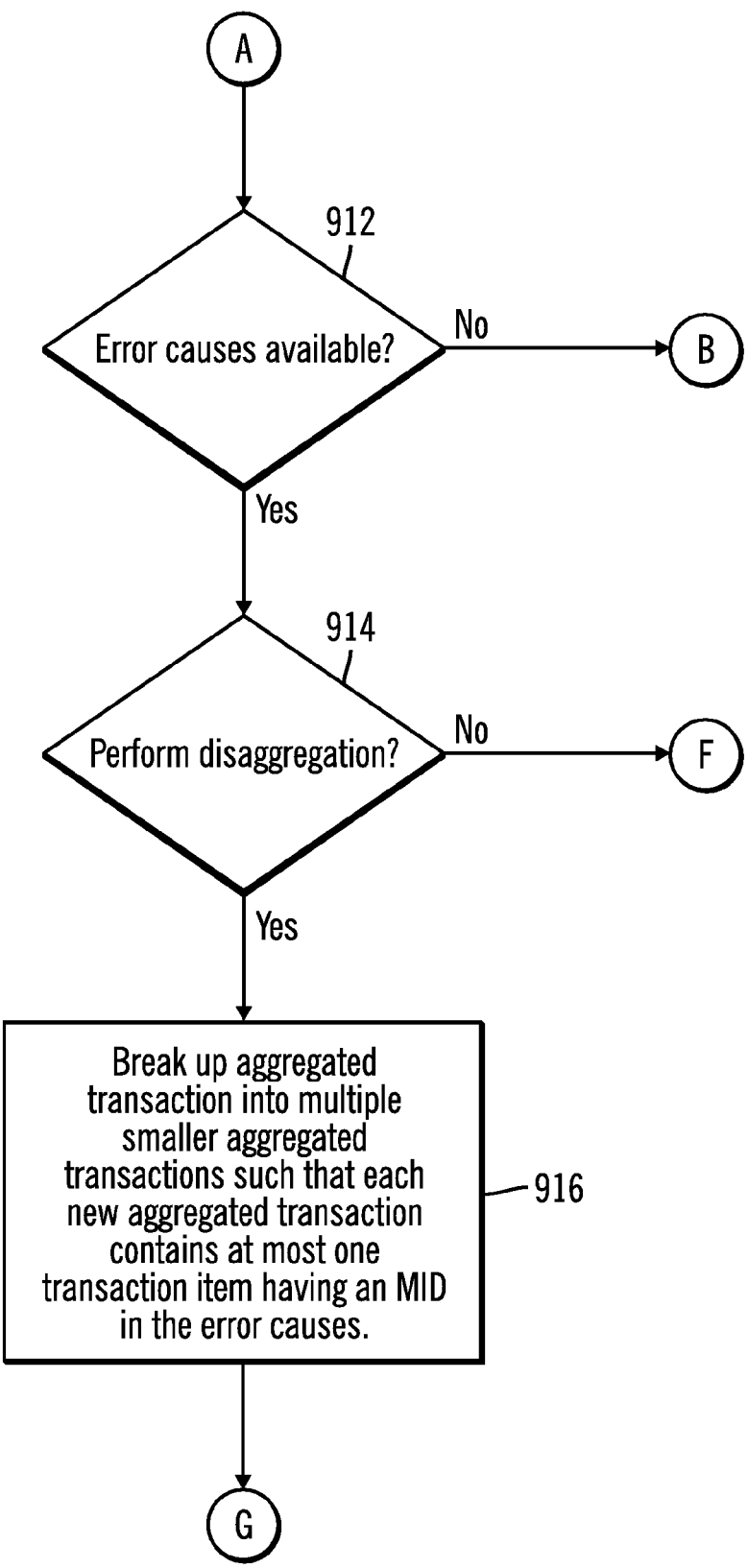
Figure 9C:
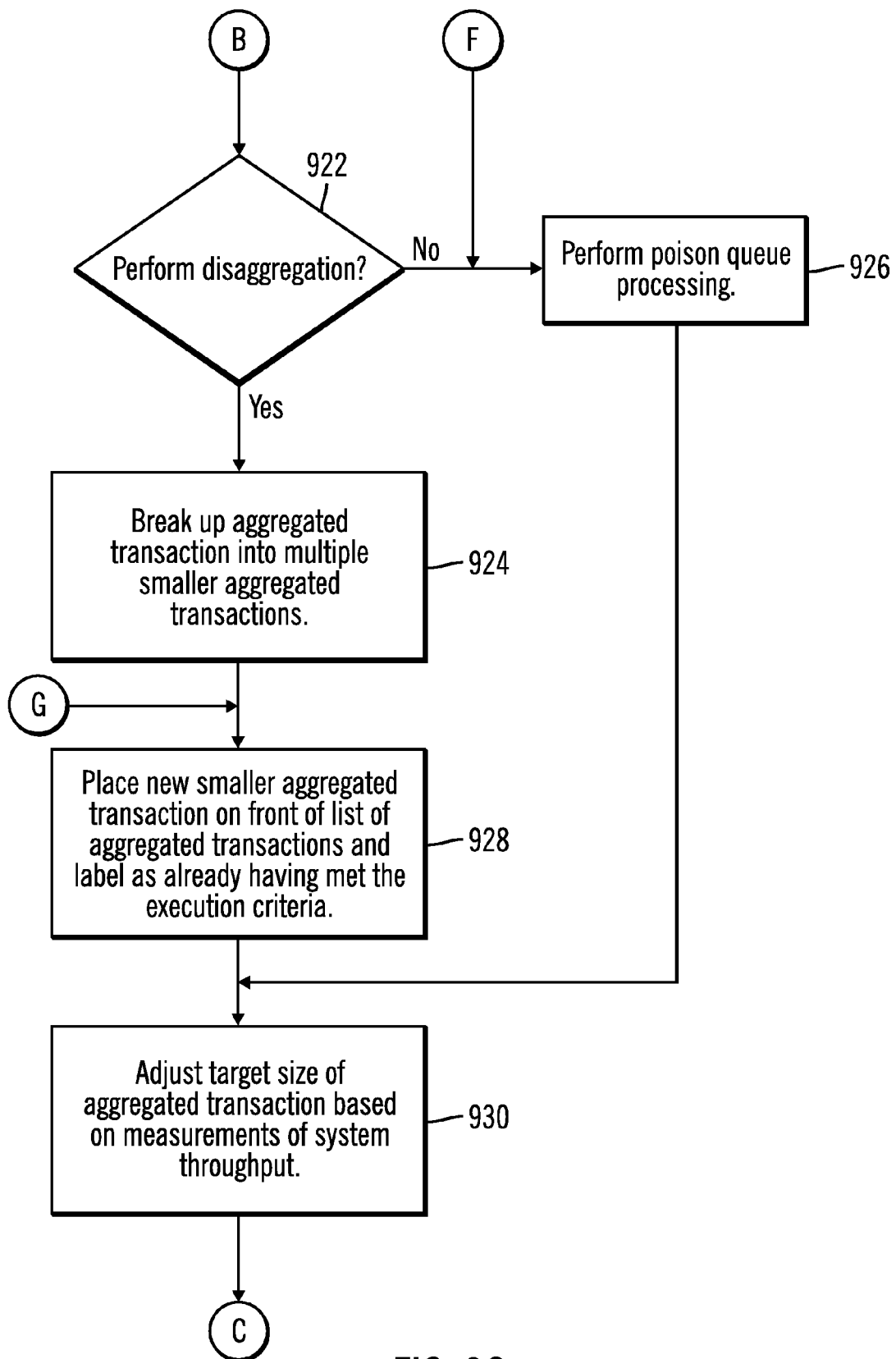

FIGS. 9A, 9B, and 9C illustrate logic in accordance with certain embodiments. Control begins at block 900 (FIG. 9A) with the TAA system 130 obtaining a transaction item with a message identifier (MID) and a session identifier (SID). In block 902, the TAA system 130 adds the transaction item to the earliest aggregated transaction (i.e., in the order of the list of aggregated transactions 150) in which no other transaction item has the same SID. In block 904, the TAA system 130 determines whether a first aggregated transaction in the list of aggregated transactions 150 has met execution criteria (e.g., expiration of a timer, size of the aggregated transaction reaches a target size, or created by disaggregation (916, 924 in FIG. 9 described below.). If so, processing continues to block 906, otherwise, processing loops back to block 900.

In block 906, the TAA system 130 sends the first aggregated transaction that has met the execution criteria down the dataflow execution process, removing it from the list of aggregated transactions 150. In block 908, once the aggregated transaction has completed going through the dataflow, the TAA system 130 determines whether to commit. In certain embodiments, the TAA system 130 relies on the wave marker, which follows all records in a transaction, to know when to begin the commit phase. If so, processing continues to block 910, otherwise, processing continues to block 912 (FIG. 9B). In block 910, the TAA system 130 commits the aggregated transaction. In block 911, the TAA system 130 adjusts a target size of an aggregated transaction based on measurements of system throughput and processing loops back to block 904.

In block 912, the TAA system 130 determines whether there are error causes available. If so, processing continues to block 914, otherwise, processing continues to block 922 (FIG. 9C). In block 914, the TAA system 130 determines whether disaggregation is to be performed. For example, the TAA system 130 determines whether disaggregation has already been performed a number of times on the aggregated transaction. In certain embodiments, this is possible, because tertiary disaggregation processes know that the messages they reprocess have already been rejected, or a bad message could be tagged with a retry counter. If disaggregation is to be performed, processing continues to block 916, otherwise processing continues to block 926 (FIG. 9C). In block 916, the TAA system 130 breaks up the aggregated transaction into multiple smaller aggregated transactions such that each new aggregated transaction contains at most one transaction item having a MID in the error causes. From block 916 (FIG. 9B), processing continues to block 928 (FIG. 9C). In block 928, the new, smaller aggregated transactions are placed on the front of the list of aggregated transactions 150, and they are labeled specially so that these newly created aggregated transactions (which are the disaggregates of a previously attempted aggregated transaction) are considered to have met the execution criteria. Hence, the first of these new disaggregates will be sent into the computation phase immediately. In block 930, the TAA system 130 adjusts a target size of an aggregated transaction based on measurements of system throughput and processing loops back to block 904 (FIG. 9A).

In block 922, the TAA system 130 determines whether to perform disaggregation though there are no error causes available. If so, processing continues to block 924, otherwise, processing continues to block 926. In block 924, the TAA system 130 breaks up the aggregated transaction into multiple smaller aggregated transactions and processing continues to block 928. In block 926, the poison queue processing is performed. This includes sending transaction items to the poison queue and, optionally, performing a secondary flow, a tertiary flow, etc. From block 926, processing continues to block 930.

Thus, embodiments provide automatic tuning of aggregated transaction size. Embodiments provide faster transaction processing and automatic tuning. Embodiments combine dataflow with transaction processing.

Embodiments are compatible with Extract, Transform, and Load (ETL) tools, complex event processing systems, and information integration at both process and data levels.

In certain embodiments, if there are messages to be processed for a session that produced a poison data item, the session may be sidelined (i.e., subsequent messages for that session are recognized and all are classified as poison data items).

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 9A, 9B, and 9C describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 9A, 9B, and 9C may be implemented in software, hardware, programmable and non-programmable gate array logic or in some combination of hardware, software, or gate array logic.

Figure 10:
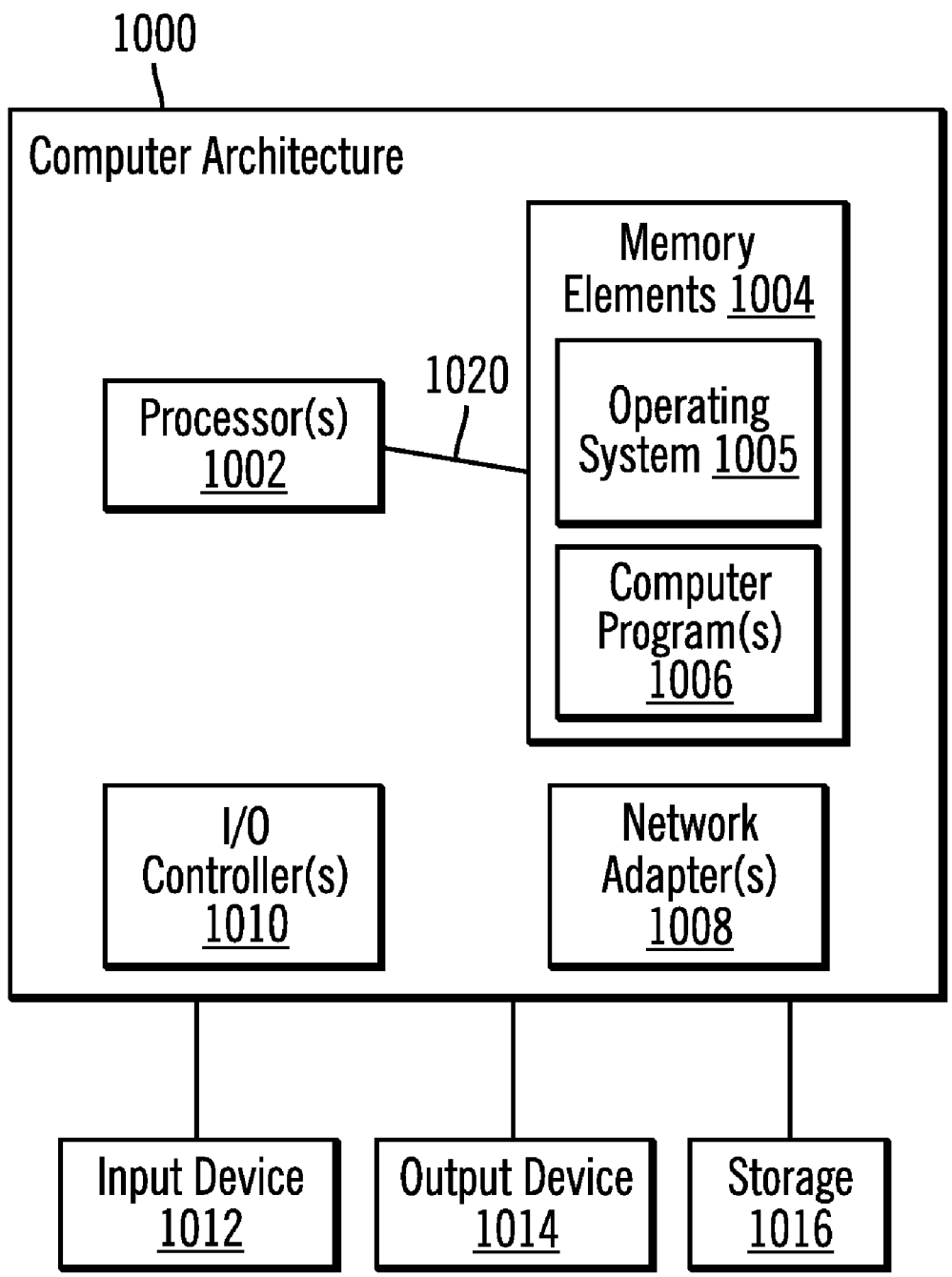
FIG. 10 illustrates a system architecture that may be used in accordance with certain embodiments.

FIG. 10 illustrates a system architecture 1000 that may be used in accordance with certain embodiments. Client computer 100 and/or server computer 120 may implement system architecture 1000. The system architecture 1000 is suitable for storing and/or executing program code and includes at least one processor 1002 coupled directly or indirectly to memory elements 1004 through a system bus 1020. The memory elements 1004 may include local memory employed during actual execution of the program code, bulk storage, and cache memories which provide temporary storage of at least some program code in order to reduce the number of times code must be retrieved from bulk storage during execution. The memory elements 1004 include an operating system 1005 and one or more computer programs 1006.

Input/Output (I/O) devices 1012, 1014 (including but not limited to keyboards, displays, pointing devices, etc.) may be coupled to the system either directly or through intervening I/O controllers 1010.

Network adapters 1008 may also be coupled to the system to enable the data processing system to become coupled to other data processing systems or remote printers or storage devices through intervening private or public networks. Modems, cable modem and Ethernet cards are just a few of the currently available types of network adapters 1008.

The system architecture 1000 may be coupled to storage 1016 (e.g., a non-volatile storage area, such as magnetic disk drives, optical disk drives, a tape drive, etc.). The storage 1016 may comprise an internal storage device or an attached or network accessible storage. Computer programs 1006 in storage 1016 may be loaded into the memory elements 1004 and executed by a processor 1002 in a manner known in the art.

The system architecture 1000 may include fewer components than illustrated, additional components not illustrated herein, or some combination of the components illustrated and additional components. The system architecture 1000 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:
    maintaining a list of aggregated transactions, wherein each of the aggregated transactions includes one or more transaction items, and wherein each of the one or more transaction items has a message identifier and a session identifier;
    obtaining a transaction item with a message identifier and a session identifier;
    adding the transaction item to an earliest aggregated transaction in an order of the list of aggregated transactions in which no other transaction item has the same session identifier;
    executing an aggregated transaction in the list of aggregated transactions that has met execution criteria;
    in response to determining that the aggregated transaction is not committing,
        detecting one or more errors;
        for each of the one or more errors, extracting a message identifier that is associated with a transaction item that caused that error; and
        breaking up the aggregated transaction into multiple smaller aggregated transactions such that each of the multiple smaller aggregated transactions contains at most one transaction item that caused an error; and
        adjusting a target size of each of the multiple smaller aggregated transactions based on measurements of system throughput.

2. The method of claim 1, further comprising:
    in response to the adjusting, placing the multiple smaller aggregated transactions on front of the list of aggregated transactions; and
    labeling the multiple smaller aggregated transactions as already having met the execution criteria.

3. The method of claim 1, wherein the execution criteria comprises at least one of expiration of a timer and a size of the aggregated transaction reaching a predetermined target size.

4. The method of claim 1, further comprising:
    in response to determining that another aggregated transaction is not committing, determining that error causes are not available.

5. The method of claim 1, wherein executing the aggregated transaction comprises sending the aggregated transaction down a dataflow execution process.

6. The method of claim 1, further comprising:
    before adding transaction items to the aggregated transactions in the list of aggregated transactions, dividing up incoming transaction items into partitions, wherein transaction items having a same session identifier are in a same partition.

7. The method of claim 1, further comprising:
    pipelining individual transaction items making up the aggregated transaction into a dataflow execution process.

8. The method of claim 1, further comprising:
    in response to determining that the aggregated transaction has committed, adjusting the target size of each aggregated transaction based on measurements of system throughput.

9. A computer program product comprising a storage device storing a computer readable program, wherein the computer readable program when executed by a processor on a computer causes the computer to:
    maintain a list of aggregated transactions, wherein each of the aggregated transactions includes one or more transaction items, and wherein each of the one or more transaction items has a message identifier and a session identifier;
    obtain a transaction item with a message identifier and a session identifier;
    add the transaction item to an earliest aggregated transaction in an order of the list of aggregated transactions in which no other transaction item has the same session identifier;
    execute an aggregated transaction in the list of aggregated transactions that has met execution criteria;
    in response to determining that the aggregated transaction is not committing,
        detect one or more errors;
        for each of the one or more errors, extract a message identifier that is associated with a transaction item that caused that error; and
        break up the aggregated transaction into multiple smaller aggregated transactions such that each of the multiple smaller aggregated transactions contains at most one transaction item that caused an error; and
        adjust a target size of each of the multiple smaller aggregated transactions based on measurements of system throughput.

10. The computer program product of claim 9, wherein the computer readable program when executed on a computer causes the computer to:
    in response to the adjusting, place the multiple smaller aggregated transactions on front of the list of aggregated transactions; and
    label the multiple smaller aggregated transactions as already having met the execution criteria.

11. The computer program product of claim 9, wherein the execution criteria comprises at least one of expiration of a timer and a size of the aggregated transaction reaching a predetermined target size.

12. The computer program product of claim 9, wherein the computer readable program when executed on a computer causes the computer to:
    in response to determining that another aggregated transaction is not committing, determine that error causes are not available.

13. The computer program product of claim 9, wherein executing the aggregated transaction comprises sending the aggregated transaction down a dataflow execution process.

14. The computer program product of claim 9, wherein the computer readable program when executed on a computer causes the computer to:
    before adding transaction items to the aggregated transactions in the list of aggregated transactions, divide up incoming transaction items into partitions, wherein transaction items having a same session identifier are in a same partition.

15. The computer program product of claim 9, wherein the computer readable program when executed on a computer causes the computer to:
    pipeline individual transaction items making up the aggregated transaction into a dataflow execution process.

16. The computer program product of claim 9, wherein the computer readable program when executed on a computer causes the computer to:
    in response to determining that the aggregated transaction has committed, adjust the target size of each aggregated transaction based on measurements of system throughput.

17. A system, comprising:
a processor;
a storage device coupled to the processor,
wherein the storage device stores program code, and
wherein the processor executes the program code to perform operations, the operations comprising:
maintaining a list of aggregated transactions, wherein each of the aggregated transactions includes one or more transaction items, and wherein each of the one or more transaction items has a message identifier and a session identifier;
obtaining a transaction item with a message identifier and a session identifier;
adding the transaction item to an earliest aggregated transaction in an order of the list of aggregated transactions in which no other transaction item has the same session identifier;
executing an aggregated transaction in the list of aggregated transactions that has met execution criteria;
in response to determining that the aggregated transaction is not committing,
detecting one or more errors;
for each of the one or more errors, extracting a message identifier that is associated with a transaction item that caused that error; and
breaking up the aggregated transaction into multiple smaller aggregated transactions such that each of the multiple smaller aggregated transactions contains at most one transaction item that caused an error; and
adjusting a target size of each of the multiple smaller aggregated transactions based on measurements of system throughput.

18. The system of claim 17, wherein the operations further comprise:
in response to the adjusting, placing the multiple smaller aggregated transactions on front of the list of aggregated transactions; and
labeling the multiple smaller aggregated transactions as already having met the execution criteria.

19. The system of claim 17, wherein the execution criteria comprises at least one of expiration of a timer and a size of the aggregated transaction reaching a predetermined target size.

20. The system of claim 17, wherein further comprise:
in response to determining that another aggregated transaction is not committing, determining that error causes are not available.

21. The system of claim 17, wherein executing the aggregated transaction comprises sending the aggregated transaction down a dataflow execution process.

22. The system of claim 17, wherein the operations further comprise:
before adding transaction items to the aggregated transactions in the list of aggregated transactions, dividing up incoming transaction items into partitions, wherein transaction items having a same session identifier are in a same partition.

23. The system of claim 17, wherein the operations further comprise:
pipelining individual transaction items making up the aggregated transaction into a dataflow execution process.

24. The system of claim 17, wherein the operations further comprise:
in response to determining that the aggregated transaction has committed, adjusting the target size of each aggregated transaction based on measurements of system throughput.

* * * * *